C. G. OLSON.
GRINDING MACHINE.
APPLICATION FILED OCT. 26, 1917.
1,259,770.
Patented Mar. 19, 1918.
6 SHEETS—SHEET 1.
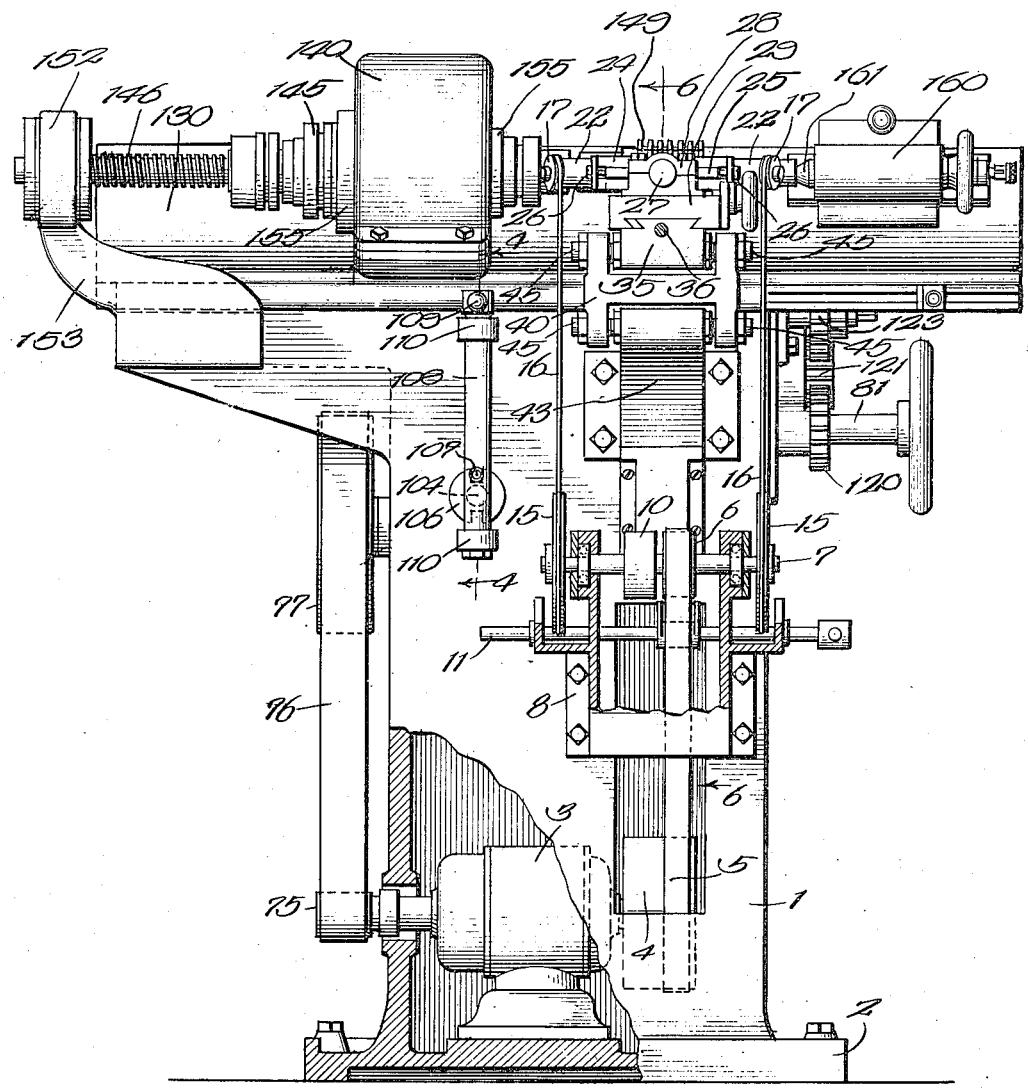
Fig. 1.
Inventor:
Carl G. Olson.
By Cheever & Cox
Attys C. G. OLSON.
GRINDING MACHINE.
APPLICATION FILED OCT. 26, 1917.
1,259,770.
Patented Mar. 19, 1918.
6 SHEETS—SHEET 2.
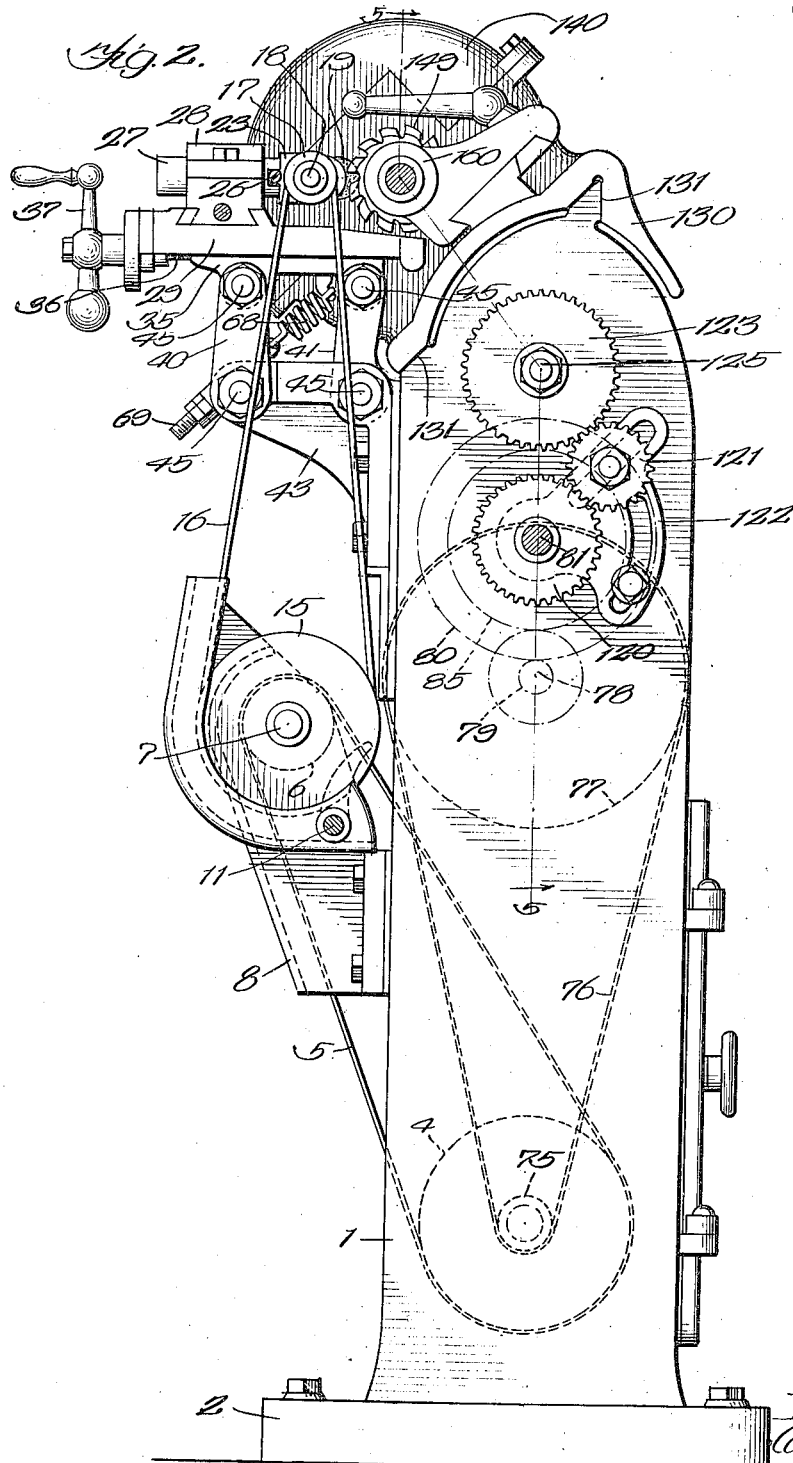

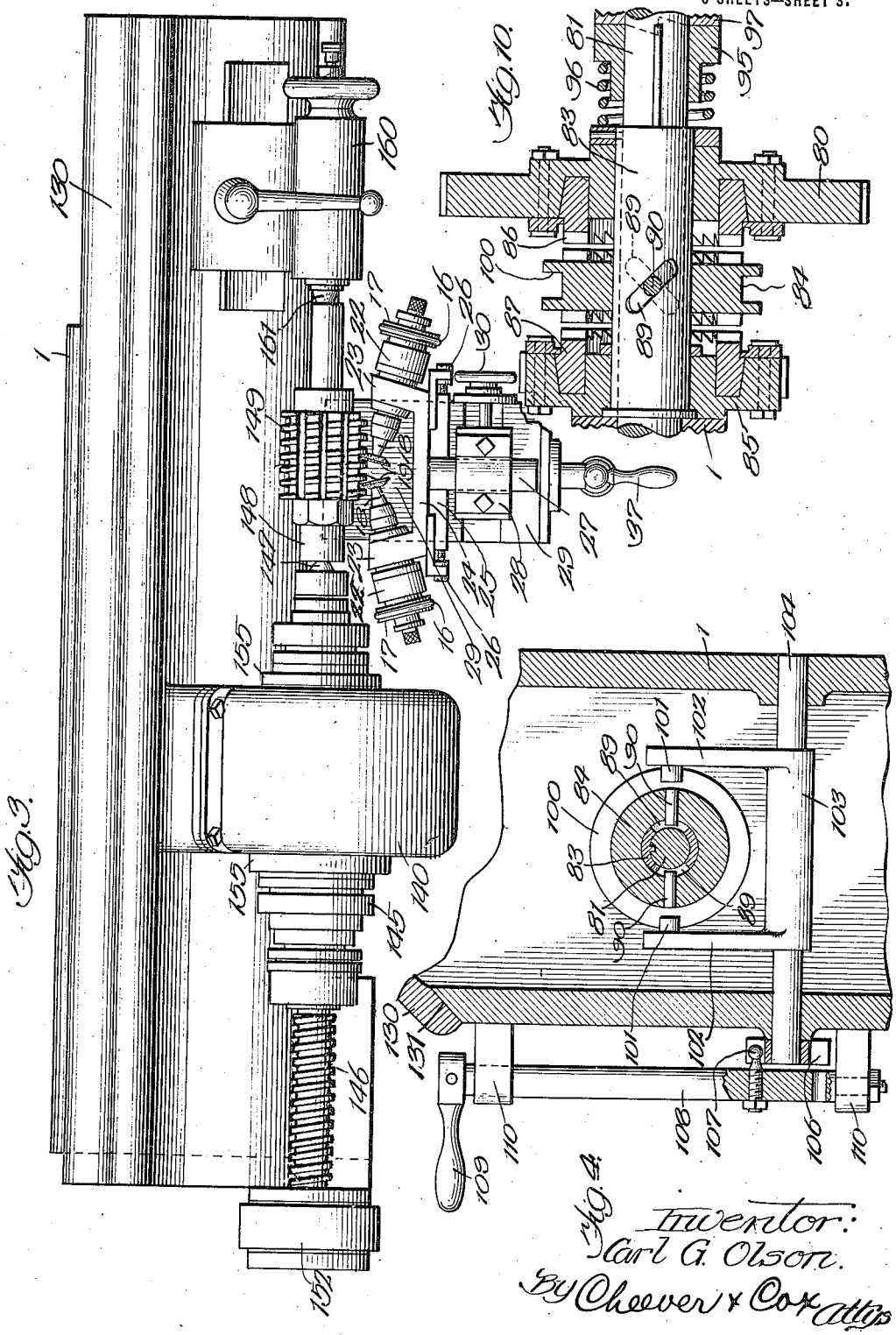

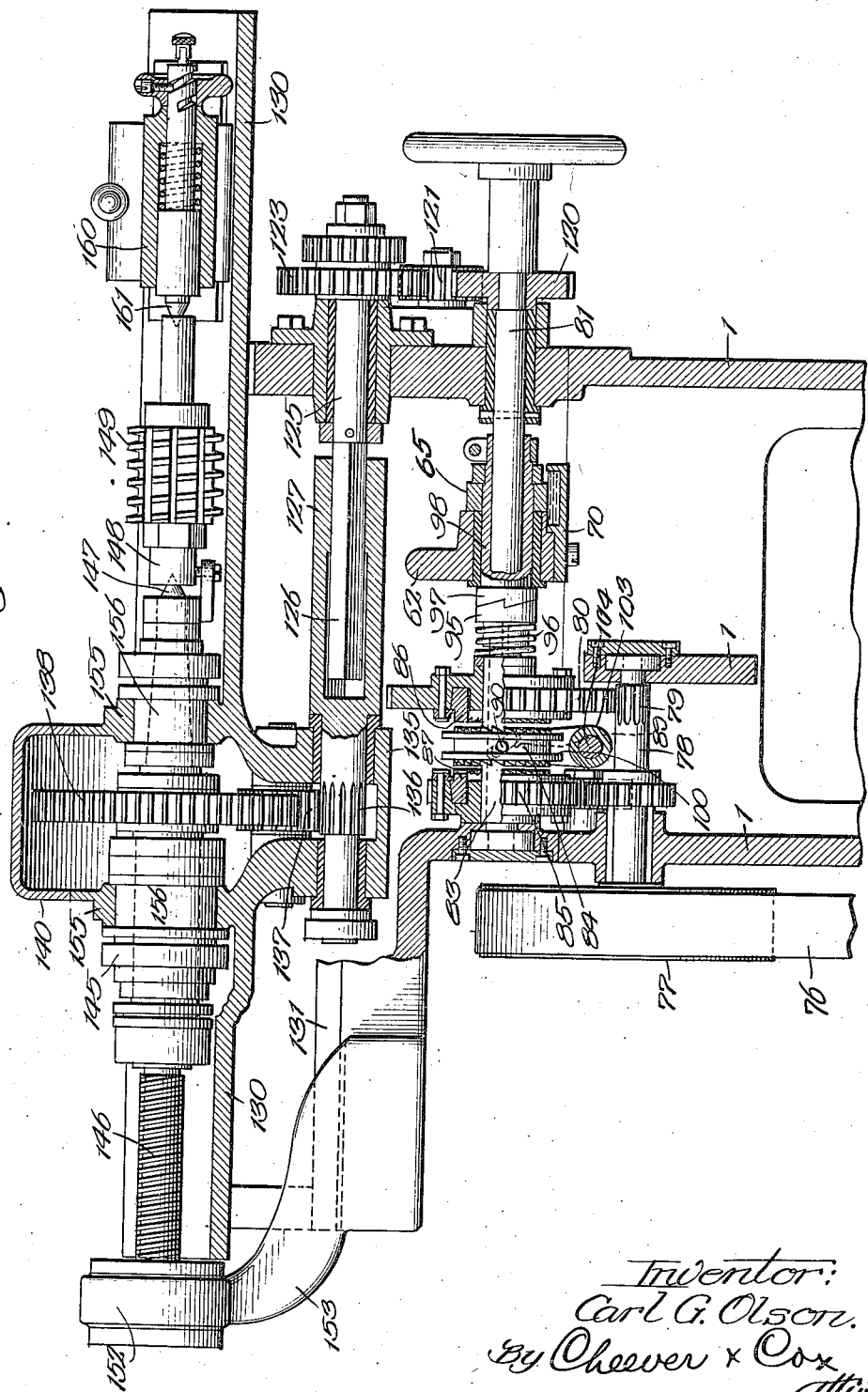

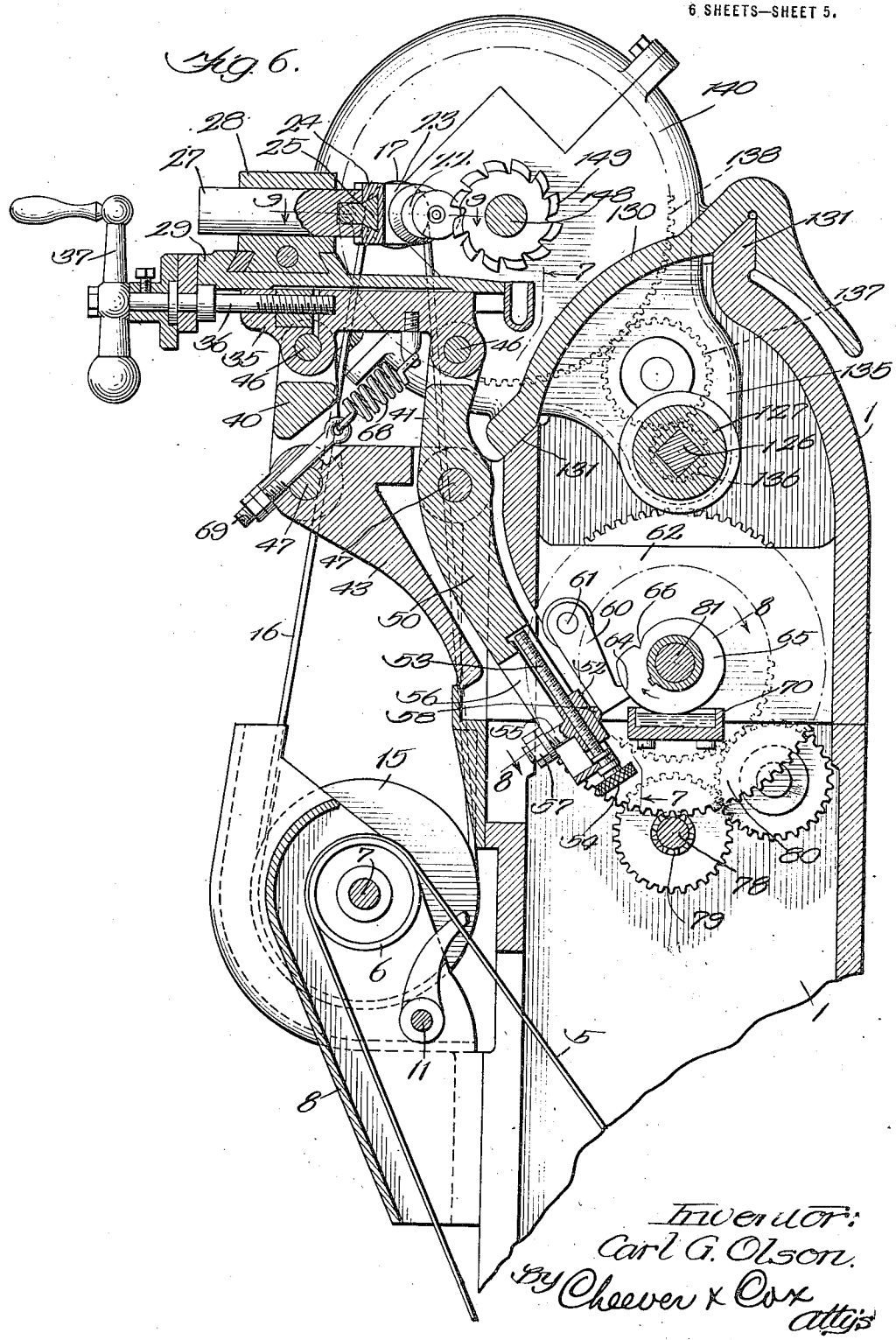

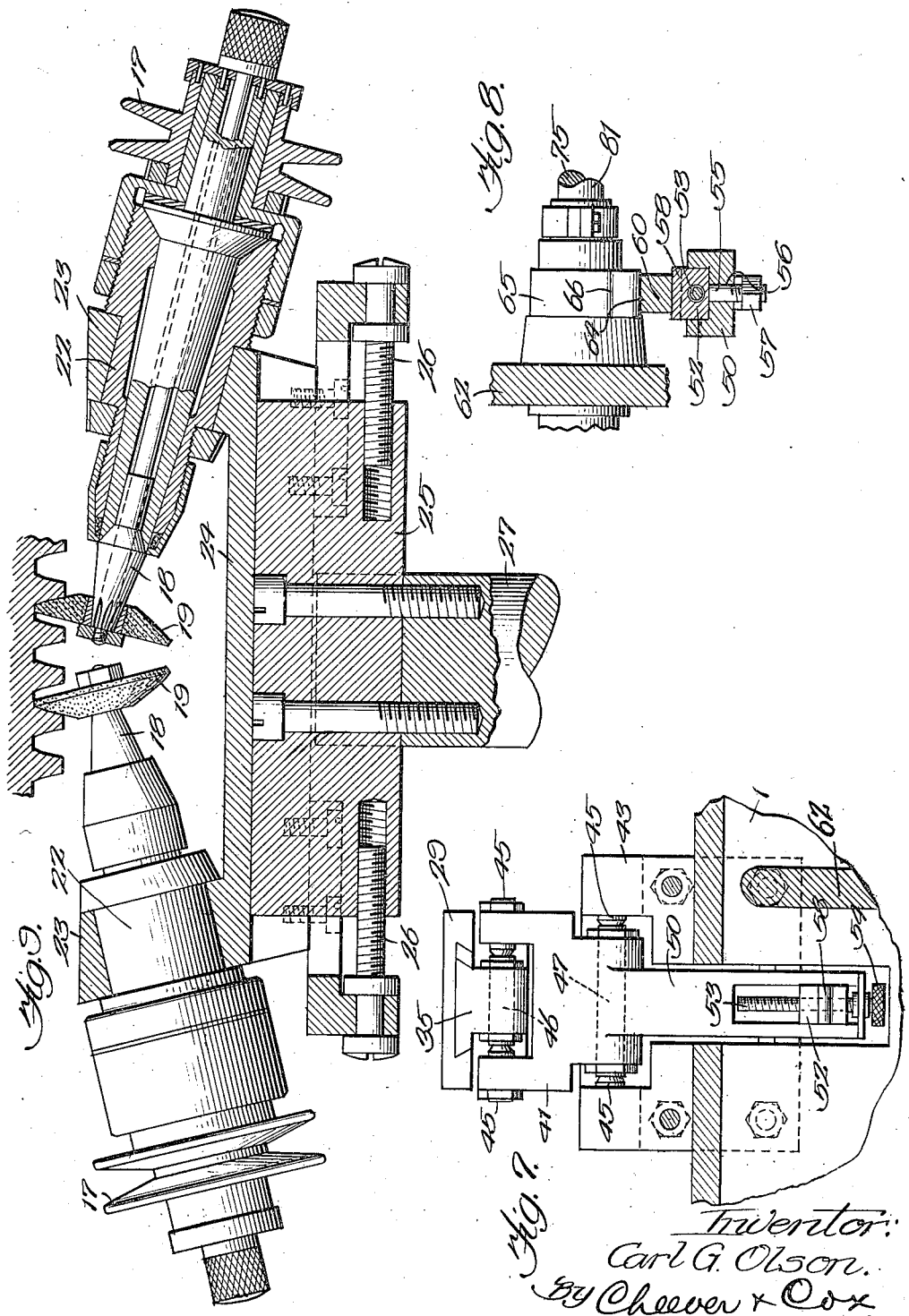

UNITED STATES PATENT OFFICE.

CARL G. OLSON, OF CHICAGO, ILLINOIS, ASSIGNOR TO ILLINOIS TOOL WORKS, OF CHICAGO, ILLINOIS, A CORPORATION OF ILLINOIS.

GRINDING-MACHINE.

1,259,770.  Specification of Letters Patent.  Patented Mar. 19, 1918.

Application filed October 26, 1917. Serial No. 198,563.

*To all whom it may concern:*

Be it known that I, CARL G. OLSON, a citizen of the United States, residing at Chicago, in the county of Cook and State of Illinois have invented a certain new and useful Improvement in Grinding-Machines, of which the following is a specification.

My invention relates to grinding machines for grinding threaded cylindrical work. In the drawings I have shown a machine adapted to produce tools having eccentrically relieved teeth forming a helical thread around their surface. A hob forms an example of such a tool, and I have illustrated a hob in process of production, but the principle of the invention is not limited to the production of hobs but may be employed for grinding taps, thread gages, drills and other tools having helical or parallel grooves around their surfaces. In the particular form selected to illustrate the invention I have shown a machine capable of simultaneously grinding the opposite sides of hob teeth. As two sides of the teeth are thus being produced simultaneously, the time of operation is greatly reduced. It may be stated, therefore, that one of the objects of the present invention is to provide means whereby the period of operation in the production of a unit of work is greatly reduced. Another object is to provide improved means for supporting the reciprocating tool carrier. In carrying out this object, I have mounted the tool carrier upon a link work instead of mounting it upon an ordinary slide. Another object is to provide means whereby to obtain especially fine adjustments as to the amount of travel of the work carrier toward and from the axis of the work. Another object is to provide a quick return movement of the tool carrier and during the time of the return prevent movement of the tool carrier toward and from the work. Still another object is to provide a self-locking clutch which operates in conection with the cam mechanism which forms part of the means for moving the tool carrier toward and from the work.

I accomplish my objects by the mechanism shown in the accompanying drawings, in which:

Figure 1 is a front elevation of the machine.

Fig. 2 is an elevation looking toward the left in Fig. 1, certain hand wheels being omitted to better reveal the coöperating elements of the machine.

Fig. 3 is a top plan view of the machine.

Fig. 4 is a sectional elevation on the line 4—4, Fig. 1.

Fig. 5 is an elevation of the entire upper portion of the machine, chiefly in section on the line 5—5, Fig. 2.

Fig. 6 is a front to rear sectional elevation of the upper part of the machine, the plane of section being indicated by the line 6—6, Fig. 1.

Fig. 7 is a view showing the back of the tool carrier and of the lever which operates it. The plane of view is suggested by the line 7—7, Fig. 6.

Fig. 8 is a sectional view of the cam mechanism and associated parts which produce the cross movement of the tool carrier. The plane of section is indicated by the line 8—8, Fig. 6.

Fig. 9 is a plan section of the tool carrier on the line 9—9, Fig. 6.

Fig. 10 is a view chiefly in axial section showing the reversing clutch and associated parts for driving the cam which reciprocates the tool carrier.

Similar numerals refer to similar parts throughout the several views.

The main frame 1 of the machine has a base 2 by which it may be bolted to the floor or other supporting object. While power may be derived from any suitable source, I have, in the present drawings, indicated a motor 3 as furnishing the power. Said motor is shown in Fig. 1 and has a pulley 4 fastened to the motor shaft for driving a belt 5. Said belt drives a pulley 6 fastened to a counter shaft 7 which is journaled in a bracket 8 bolted or otherwise secured to the front of the main frame, as best shown in Figs. 1, 2 and 6. By preference, this shaft is provided with ball bearings and has an idler pulley 10 so that when the belt shifter 11 shifts the belt to pulley 10, the shaft 7 will not revolve. I have provided means whereby two sides of the hob teeth may be ground at once. With this in mind, I have furnished the counter shaft 7 with two sheaves 15, which drive belts 16 which, in turn, drive sheaves 17 which drive the spindles 18 by which the grinding wheels 19 are rotated. As I do not herein embody claims to the spindle construction itself, it is sufficient for the present purpose to say that the spindles rotate within housings 22 fastened within the bosses 23 formed upon the tool holder 24, as shown on an enlarged scale in Fig. 9. The tool holder is slidably mounted upon the block 25 which forms part of the carriage. It holds the spindles at an angle with the axis of the hob, and thus enables the parts which support the grinding wheels to clear the work as the work travels past. The position of the tool holder may be adjusted by means of the adjusting screws 26. Block 25 is fastened to a shank 27 which is clamped or otherwise fastened in the tool post 28 mounted upon the slide 29. The tool post is adjustable in the direction of the length of the machine by means of a hand wheel 30 and appropriate screw mechanism which need not be described in detail. Slide 29 is mounted upon a table 35. The slide is adjustable toward and from the work horizontally by a screw 36 operated by hand lever 37, as shown in detail in Fig. 6. The table reciprocates horizontally from front to rear of the machine, being supported upon a link work composed according to the present design of a front link 40 and a back link 41. Link 40 is pivoted to the bracket 43 which is bolted or otherwise fastened to the front of the main frame. Link 41 is similarly pivoted to bracket 43. While the form of pivot connections may be varied, I prefer to employ conically pointed, longitudinally adjustable, pins 45, the points of which enter into the conical recesses in the ends of the two steel shafts 46 and 47, mounted within said links. Link 41 has a downward extension 50, shown on a large scale in Fig. 6 and in rear elevation in Fig. 7. The parts 41 and 50 constitute a rocking lever which oscillates upon the rear shaft 47 as a fulcrum. The rocking of this lever moves the table 35 back and forth upon its supporting links and thus causes the tools (the grinding wheels) to move radially toward and from the work (in this case the hob). It will be understood that the cross movement of the table is comparatively slight, commonly in the neighborhood of an eighth of an inch, and within any such limits the motion of the tool toward and from the work will be substantially rectilinear.

I will now describe the means whereby the rocking lever 50 is actuated to produce the cross movement of the tool carrier or grinding head.

The lower end of lever 50 is bifurcated to form ways for a sliding block 52. Said block is adjusted lengthwise of the lever by an adjusting screw 53 provided with a knurled head 54. Said block has a stem 55 which extends through a slot 56 in lever 50, as shown in detail in Figs. 6 and 8. The outer end of the stem is threaded to take a nut 57. By tightening up this nut, the block may be fastened in any position to which it has been adjusted upon the lever. The block has a rounded nose 58 which contacts the back of an arm 60 pivoted upon the screw 61, as best shown in Fig. 6. Screw 61 is stationary, being supported in the crossbrace 62 of the main frame. At its free end the arm has a finger 64 which contacts the acting surface of a cam 65. Said cam which is preferably an involute, is made with a constant rise extending over approximately seven-eighths of a circumference and a drop which is confined to the remaining one-eighth of the circumference. These proportions may, of course, be varied, but the example given produces satisfactory results for it produces a gradual movement of the grinding wheels toward the axis of the work and a quick return movement. A depression 66 is formed in the acting surface of the cam at one point in the above mentioned drop, thus forming a shoulder or stop as will be hereinafter explained. As the cam rotates in the positive direction (anti-clockwise, Fig. 6), the levers 60 and 50 are gradually pushed radially outward, thus causing a corresponding movement of the grinding tools toward the hob axis until the drop portion is reached, whereupon the wheels will be quickly withdrawn. When the finger 64 of the lever 60 is within the depression 66 of the cam the grinding wheels clear the hob teeth entirely. The contactor block 52 is constantly urged toward the lever 60 and cam 65 by a spring 68, one end of which is attached to the table 35 and the other end to an adjusting screw 69 mounted in bracket 43, as best shown in Figs. 2 and 6. It is desirable to keep the acting surface of the cam 65 constantly lubricated by means of an oil receptacle 70 which, as shown in Fig. 6, is located beneath the cam and contains oil into which the surface of the cam constantly dips.

To now describe the mechanism for rotating the cam:

The motor shaft, in addition to being provided with the pulley 4, has a pulley 75, as shown near the bottom of Figs. 1 and 2. It drives a belt 76 which, in turn, drives a pulley 77, rigidly fastened to shaft 78. Said shaft, which is shown near the lower portion of Fig. 5, is journaled in the main frame of the machine and has a pinion 79 which is in constant mesh with the gear wheel 80. Shaft 78 also has fastened to it a pinion 82 which is in constant mesh with a gear wheel 85. Thus gear wheels 80 and 85 rotate constantly but in opposite directions. The gear ratios are such that wheel 85, which comes into action on the return of the tool, rotates faster than wheel 80, which is effective during the operative period of the cycle. This gives a quick return travel to the carriage, hereinafter mentioned. Wheels 80 and 85 are non-shiftable, laterally, but are loose upon the sleeve 83 which is splined upon the cam shaft 81. On their opposing faces the wheels 80 and 85 have toothed clutch rings 86 and 87 respectively, adapted to be engaged, one at a time, by the clutch member 84 which is interposed between said clutch rings and has teeth on its lateral faces for engaging the teeth on the gear wheels 80, 85. The clutch member 84 has a limited amount of movement relatively to sleeve 83 and yet its function is to drive it and through it the clutch shaft 81. Said sleeve has oblique slots 89, 89 formed in it which receive the inner ends of pins 90 which are fastened in the clutch member 84. The clutch teeth are so faced and the slots 89 so inclined that when the clutch member is shifted toward gear wheel 80 and the clutch ring on said gear wheel commences to rotate the clutch member, the rotary movement of the pins, acting upon the oblique sides of the slots 89, will create a tendency to still further shift the clutch member toward the gear wheel 80, thus rendering it certain that the clutch parts will remain safely interlocked. Upon the same principle, when the clutch member is shifted toward wheel 85, the cam and pin connections will create a tendency to hold the parts locked together and cause the cam shaft 81 to rotate in reverse direction. It will thus be seen that the sleeve 83, and consequently the shaft 81, rotate forward or backward, depending upon the position to which the clutch member 84 is shifted. When the shaft is rotating in the same direction as wheel 80, it is rotating in a positive or forward direction, and it is during this time that the tool is acting upon the work. It is during this time also that the arm 60 is in contact with the involute portion of cam 65.

Power is transmitted from shaft 81 to the cam when rotating in a positive direction in the following manner:

A clutch member 95 is splined upon shaft 81, as best shown in Figs. 5 and 10. A helical spring 96, which encircles the shaft, constantly urges said clutch member toward a companion clutch member 97 which is integral with or otherwise rigidly fastened to a sleeve 98, which is rotatable independently of shaft 81, but non-shiftable lengthwise of said shaft. Cam 65 is keyed to sleeve 98 and hence rotates with it at all times. The parts are so constructed that when shaft 81, and hence the clutch member 95, rotates in a positive direction, it rotates the clutch member 97, and hence the cam, in a forward direction; but when said shaft and clutch member 95 rotate in the reverse direction, they rotate the cam in a reverse direction until the depression 66 in the cam is brought under the finger 64 of arm 60, whereupon the arm arrests the cam and sleeve and the obliquely formed teeth of the clutch members 95 and 97 force the shiftable member 95 out of engagement with the non-shiftable member 87. The members 95 and 97 consequently operate as a ratchet and cause the cam to rotate in a positive direction, but are able to rotate it in a negative direction only until the cam is arrested by the arm 60. At the time when the cam is thus arrested, the arm, being in the deepest part of the cam, will hold the grinding wheels entirely clear of the work, thus making it possible for the parts to return to starting position without interference with each other.

The clutch member 84, which may be termed the "master clutch," is manually shiftable through the agency of mechanism best shown in Fig. 4. It has a peripheral groove 100 which receives the pins 101 of the forks 102, the hub 103 of said fork being rigidly fastened to the rock shaft 104. Said rock shaft is journaled in the main frame 1 and rocked in the present case by means of a pinion 106 engaged by the head of a stud 107 fastened to a second rock shaft 108. The latter is provided with a handle 109 and is journaled in brackets 110 projecting from the main frame.

I will now describe the carriage which supports the work and the means for causing the work to rotate the carriage to travel.

Rigidly fastened to shaft 81 is a pinion 120, best shown in Figs. 1, 2 and 5. It meshes with an idler 121 which is mounted in a rocking frame 122 and serves to transmit motion to the gear wheel 123. By changing the size of the idler and of the gear wheel 123 the speed ratio of the gearing may be varied. By introducing a second intermeshing idler in the rocking frame, the direction of motion may be reversed. Gear wheel 123 is rigidly fastened to shaft 125 which is journaled in the main frame and has a squared end 126 which fits slidingly within the interiorly squared hollow shaft 127. Shaft 125 imparts rotation to hollow shaft 127 and at the same time permits the latter to slide longitudinally in synchronism with the traveling carriage 130. While the design may be varried, the carriage, in the present case, slides upon longitudinal ways 131 formed near the top of the main frame. Shaft 127 is journaled in a hanger 135 depending from the carriage and has a pinion 136 which meshes with an idler 137, which drives the gear wheel 138, as best shown in Fig. 5. The last mentioned gear wheel is inclosed within a housing 140. The headstock spindle 145 is journaled in bearings 155 and is rotated by gear wheel 138. The specific construction is immaterial and need not be here described. It is sufficient to say that at the outer end said spindle has a lead screw 146 and at the other end a center point 147 which forms a bearing for the arbor 148 which carries the work 149. The lead screw works in a nut 152 carried by a bracket 153 integral with or fastened to the main frame. The bearings 155 fit in grooves 156 in the headstock spindle, and the result is that when the lead screw is rotated under the action of the gear wheel 138, the carriage 130 is caused to travel lengthwise upon the main frame. The tailstock 160 has a center point 161 for supporting the opposite end of the arbor 148.

The operation of the machine as a whole will now be readily understood. The carriage which supports the work travels upon the main frame and carries a part of the train of gearing whereby the work is rotated. The tool carrier does not travel longitudinally but has a cross motion toward and from the axis of the work, said cross motion being produced by the action of the oscillating lever 50 which causes the tool carrier to rock back and forth upon its supporting linkwork. The rocking lever is actuated by the cam 65 during the acting period of the cycle of operation and permits the grinders to clear the work during the return travel of the carriage. The grinders rotate continuously under the action of the belts 16 and thus shape up the work. Let it be assumed that a hob is to be produced and that the carriage is in starting position; that is, at the initial end of its travel. The operator, after throwing on the power, throws the clutch member 84 into engagement with the clutch ring 86 and thus drives the gear 80 and cam 65 in the positive direction. This causes the tool carrier to move the rotating grinders toward and from the axis of the hob, the grinders moving toward the axis during about seven-eighths of a revolution of the cam and completing the out motion in about one-eighth of a revolution of the cam. At the same time, the travel of the carriage causes the rotating hob to travel past the grinding wheels and thus allow for the pitch of the hob teeth. After the entire hob has passed the grinders, the operator shifts the clutch member 84 into engagement with the clutch ring 87 on gear 85 and thus reverses the direction of rotation of the lead screw. It also causes the cam 65 to rotate in a reverse direction until arrested by the arm 60. This permits the spring 68 to draw the tool carrier away from the work to such an extent as to cause the grinders to clear the hob teeth as the carriage moves in the return direction. This completes the cycle of operation.

I would call particular attention to the manner in which the tool carrier is supported and actuated. By supporting it upon a linkwork instead of upon guideways, the friction losses are reduced to a minimum and the life of the machine correspondingly increased. Moreover, I am able to employ comparatively large bearing surfaces at the pivots and to provide adjustable pivot points whereby the wear may be taken up if and when it occurs. This linkwork construction also makes it practical to operate the tool carrier at a considerably higher speed than if ordinary guideways were employed. Another advantage of my construction is that a very fine adjustment of the amount of cross travel of the tool carrier is obtainable, for it will be understood that by shifting the contactor 52 along the arm 60 toward the pivot 61 (see Fig. 6), the amount of travel will be reduced and, as the position is controlled by a screw (the part 54), any desired position may be obtained. As a result of the peculiar arrangement of the grinding wheel spindles and their support, I am able to grind both sides of the hob teeth during a single trip of the carriage.

Having thus described my invention, what I claim as new and desire to secure by Letters Patent, is:

1. A machine tool having means for supporting the work, a cross-moving tool carrier, a movable cam, a pivoted arm oscillated by said cam, and a transmitter actuated by said arm for reciprocating the tool carrier, said transmitter being adjustable toward and from the axis of the arm for varying the amount of motion transmitted to the tool carrier.

2. A machine tool having means for supporting the work, a reciprocating tool carrier, a rotating cam, two pivoted arms, and a transmitter adjustable with respect to one of said arms for varying the amount of motion transmitted from one to the other of them, one of said arms being actuated by the cam and the other being actuated by the transmitter and serving to reciprocate the tool carrier.

3. A machine of the class described having a support for the work, a reciprocatable tool carrier, a rotating cam, a lever for reciprocating said tool carrier, and means whereby a varying amount of the eccentricity of the cam may be transmitted to said lever to thereby regulate the amount of reciprocation of the tool carrier.

4. A machine of the class described having a support for the work, a tool carrier, a linkwork for supporting said tool carrier and moving it toward and from the work, a lever for reciprocating the tool carrier, a contactor block mounted on said lever and adjustable lengthwise thereof, and a pivoted arm engaging said contactor block, said arm being actuated by said cam.

5. A machine tool having a support for the work, a reciprocatable tool carrier, a shaft capable of rotating forward and backward, a cam for reciprocating said tool carrier, said cam being mounted on said shaft and being rotatable independently thereof, connections between the shaft and the cam tending always to rotate the cam in unison with the shaft, said connections being yieldable when the shaft is rotating backward, and a stop for preventing backward rotation of the cam, whereby reciprocation of the tool carrier is discontinued during the backward rotation of the shaft.

6. A machine tool having a support for the work, a transversely reciprocatable tool carrier, the work support and the tool carrier having relative travel lengthwise of the work, a rotating cam for reciprocating the tool carrier, the acting surface of the cam having a portion of excess eccentricity for causing the tool to recede sufficiently to clear the work, the cam being rotatable forward and backward, and means for arresting the cam when, on the backward rotation of the cam, the portion of excess eccentricity is engaged.

7. A machine tool having a support for the work, a reciprocatable tool carrier, a shaft capable of rotating forward and backward, a cam for reciprocating said tool carrier, said cam being mounted on said shaft and being rotatable independently thereof, a spring clutch forming a connection between the shaft and the cam, said clutch having ratchet teeth so faced as to transmit rotation to the cam when the shaft is rotating forward and to force the clutch parts out of engagement when the cam is held and the shaft rotates backward, and a stop for preventing backward rotation of the cam, whereby reciprocation of the tool carrier is discontinued during the backward rotation of the shaft.

8. A machine tool having a support for the work, a tool carrier reciprocatable toward and from the work, an arm for reciprocating the tool carrier, a rotating cam for actuating the arm, the cam being rotatable forward and backward and having a depression with a shoulder so formed that the arm will slip over it when the cam is rotated forward but will engage it when the cam is rotating backward, the arm, when in the depression, holding the tool carrier at maximum distance from the work to enable the tool to clear the work.

9. A machine tool having a work carrier, a tool carrier, one of said carriers traveling relatively to the other, a lead screw and nut for causing relative travel of the carriers, a rotatable member connected to the lead screw for rotating it, two coöperating, relatively shiftable, rotatable clutch elements, one for furnishing the power and the other for rotating said rotatable member, and automatic means for urging said clutch elements toward each other when they are in engagement, to thereby insure the coöperation of said clutch elements.

10. A machine tool having a work carrier, a tool carrier, one of said carriers traveling relatively to the other, a lead screw and nut for causing relative travel of the carriers, a rotatable member connected to the lead screw for rotating it, two coöperating, relatively shiftable, rotary clutch elements, one furnishing the power and the other for rotating said rotatable member, and a slot and pin connection between one of the clutch elements and said rotatable member, the slot being oblique to the axis of rotation for urging the clutch elements into close engagement with each other.

11. A machine tool having a work carrier, a tool carrier, one of said carriers traveling relatively to the other, a lead screw and nut for causing relative travel of the carriers, and a clutch for causing rotation of the lead screw backward or forward, said clutch comprising a forward rotating power member, a backward rotating power member, a cylindrical member coaxial with them, and a member shiftable upon said cylindrical member to engage one or the other of said power members, and a slot and pin connection between the shiftable member and the cylindrical member, the slot being oblique to the axis of rotation for the purpose described.

12. A machine for grinding objects having a thread encircling them, said machine having a rotating grinding wheel adapted to engage the work near the periphery of the wheel, and a holder for the grinding wheel, said holder having a maximum diameter greater than the maximum diameter of the grinding wheel, and the holder being arranged at an oblique angle to the axis of the work, for non-interference therewith.

13. A machine for grinding objects having a helical thread encircling them, said machine having means for supporting and simultaneously rotating the work, the machine also having a rotating grinding wheel adapted to engage the work near the periphery of the wheel, a holder for the grinding wheel, and means for causing relative travel between said holder and said work supporting means, said holder having a maximum diameter greater than the maximum diameter of the grinding wheel and being arranged with its axis oblique to the axis of the work for clearing the work in passing.

14. A machine for grinding objects having a helical thread encircling them, said machine having means for supporting and simultaneously rotating the work, the machine also having two rotating grinding wheels adapted to engage the work on opposite sides of the thread, and near the periphery of the wheels, holders for the grinding wheels, and means for causing relative travel between the holders and the work supporting means, said holders having maximum diameters greater than the maximum diameter of the grinding wheel and being arranged with their axes oblique to the axis of the work and oblique to each other.

In witness whereof, I have hereunto subscribed my name.

CARL G. OLSON.